INVENTOR
JACQUES MAHO,
BY
Richardson, David and Nordon   ATTORNEYS

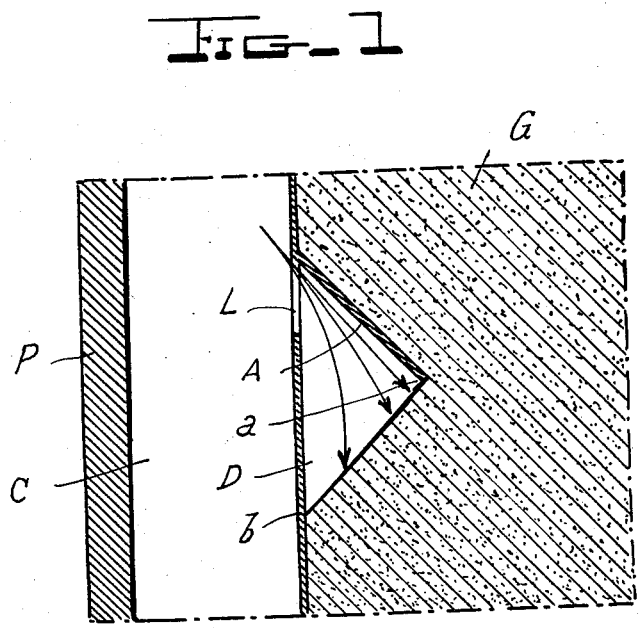

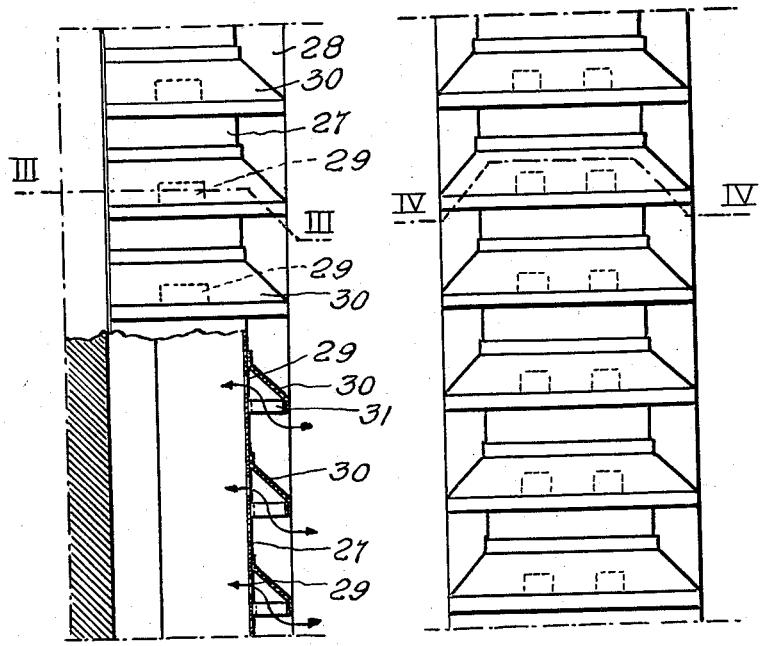
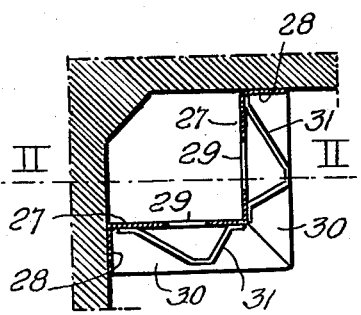
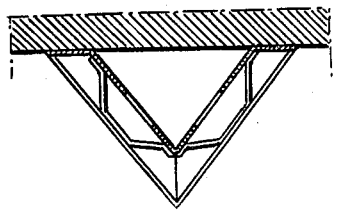

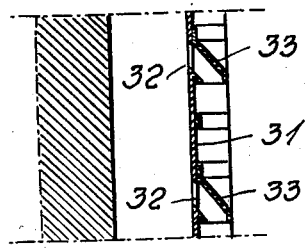
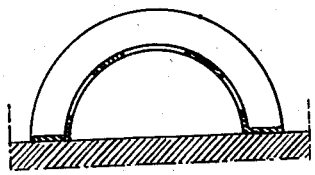
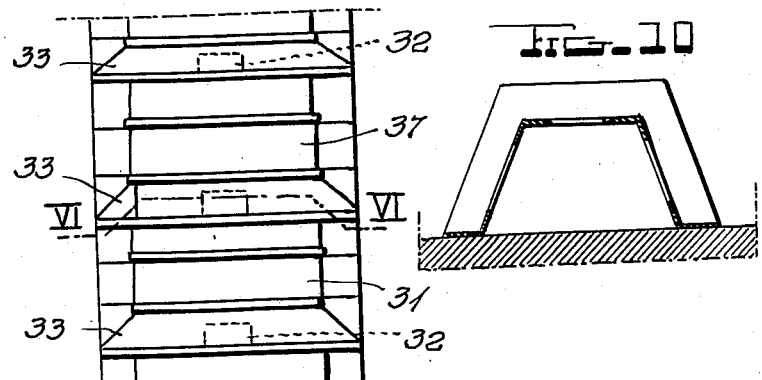
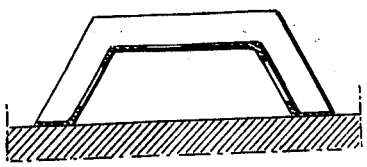
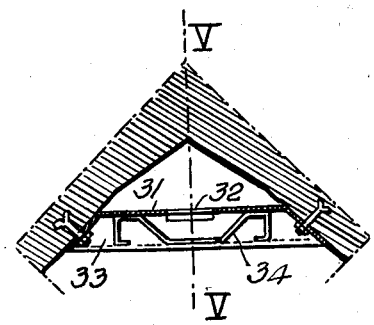
INVENTOR
JACQUES MAHO,

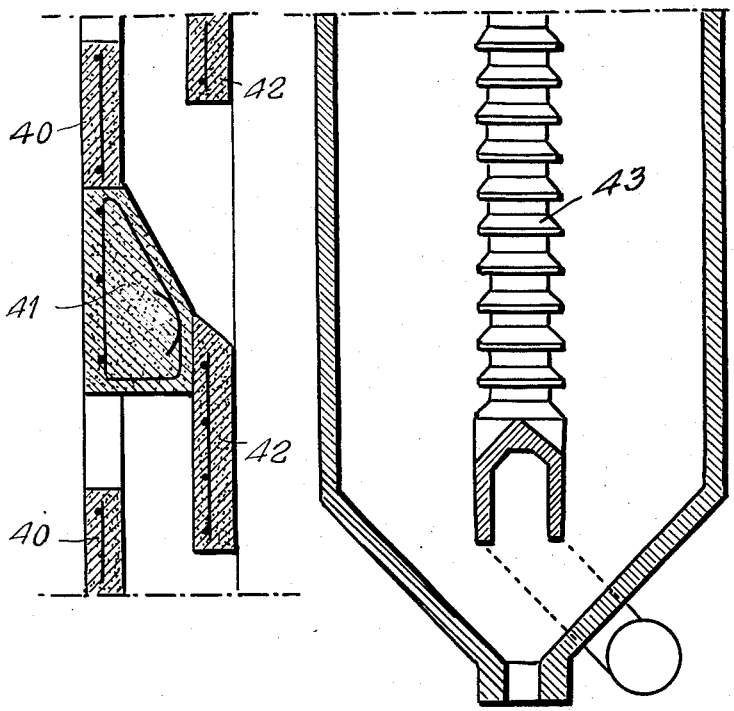
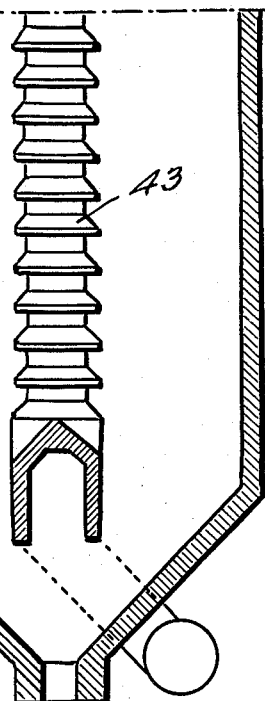
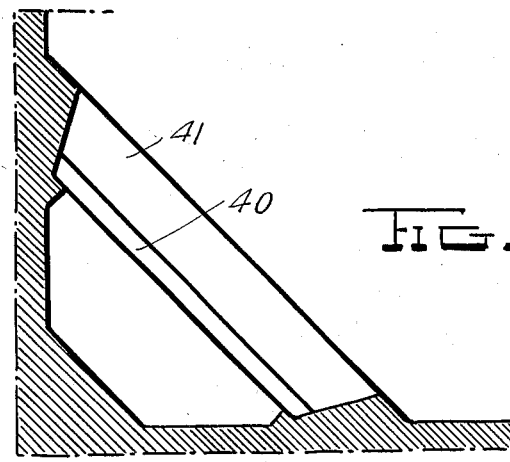

United States Patent Office 2,906,190
Patented Sept. 29, 1959

2,906,190

DIFFUSING DUCTS FOR THE VENTILATION OF CEREALS OR GRANULAR PRODUCTS STORED IN SILOS OR WAREHOUSES

Jacques Maho, Larchmont, N.Y.

Original application August 14, 1951, Serial No. 241,828, now Patent No. 2,711,128, dated June 21, 1955. Divided and this application March 7, 1955, Serial No. 492,721

6 Claims. (Cl. 98—56)

The present invention relates to vertical ventilating or air diffusing ducts for the ventilation of cereals or granular products stored in granaries, silos or warehouses.

Grain consists of living particles which "breathe." They consume oxygen, using it for burning the sugar coming from their starch and producing carbon dioxide and water vapour. The more they breathe the more their weight diminishes. Activity increases with temperature and water content.

Consequently for storing grains it is necessary to ventilate them periodically to remove the carbon dioxide in which they are bathed and which tends to produce fermentation. This ventilation also has for its object to cool them and to dry the grains.

To this end a known technique consists in causing passage-ways to pass through the grain for introducing air into the mass of grains to be conditioned, and these ducts should ensure a good distribution of the air in the center of the grain mass while opposing the entry of the grains into the ducts.

These ducts may also serve for the withdrawal of the air from the mass of the grains, which air may either come from one or more other ducts or from the free surface of the pile of grain.

Ventilation installations are often very large and the present invention has for its object the provision of diffusing ventilating ducts which are easy and economical to construct and to install and which present very efficient air diffusing characteristics.

According to the invention there are provided vertical ventilation ducts or walls, through which air is introduced or blown into the mass of grain, or drawn off from this mass, comprising one or more expansion chambers permitting the ventilation air to enter the mass of the grain or to leave it through a relatively large surface in relation to the outlet or inflow air orifices.

The general structure of the invention is shown by Fig. 1 which represents a vertical section taken along the axis of a vertical duct embodying the invention.

Referring to Fig. 1, a vertical duct will be seen placed along the wall P of the warehouse. This consists of a wall member W which together with a vertical wall P of the granary defines an air passage C. Extending downwardly and outwardly from the exterior of the duct wall W is a baffle member A. The baffle member A together with the exterior of the duct wall W defines a unitary expansion chamber D which is closed at its top and open at its bottom, as shown. The expansion chamber D communicates with the air passage C through an aperture L formed in the duct wall W adjacent to and below the closed top of the expansion chamber D. One or more further apertures L may be provided which are at the same height but laterally spaced from the single aperture L which is visible in the drawing. The surrounding grain G slopes downwardly along the line a—b beneath the lower edge of the baffle member A so that a large surface area of the grain G is exposed to the open bottom of the expansion chamber D. The lower edge of the baffle member A is located below the lower edge of the aperture L.

The value of the expansion chamber D resides in the fact that it permits ventilation air to enter or leave the mass of the grains by the large surface a—b which permits obtaining good aeration by utilizing only a relatively small air pressure, the air passage surface through the interstices between the grain and the surface a—b being greater than the total effective surface of the aperture or apertures L through which air enters or leaves through the passage C. The arrows of Fig. 1 indicate the air streams in the direction in which these are blown into the mass of grain in one direction, or emerges therefrom in the case of an exhaust duct, but the advantages of the invention are retained when the direction of ventilation is reversed for exhaust purposes.

It should be understood that the position of the lower edge of the roof baffle member A can vary according to the natural flow slope of the stored material but it will always be important that the flow slope surface a—b should be as large as possible.

In certain warehouses and in particular in silos or granaries it is important to arrange the diffusing ducts so that they extend vertically. In this case they may be either isolated and surrounded on all sides by the cereals or products to be ventilated or they may be placed along the silo walls. In this latter case they may be located at any desired positions along the vertical wall and they may also be fixed in the corners of the storage chamber.

The vertical diffusing ducts, whatever their positions, may have sections which are rectangular, trapezoidal, triangular, circular or semicircular. They each comprise a duct wall member which extends vertically and which defines at least in part an air passage. Where the duct is spaced from the walls of the storage chamber, the air passage is defined by the duct wall member alone. Where the duct is located against a wall or in a corner of the storage chamber, the air passage is defined in part by the duct wall member and in part by the wall or corner walls of the storage chamber. Baffle members are fixed to the exterior of the duct wall member at a series of vertically spaced positions therealong. The baffle members, as described above, slope downwardly and outwardly from the exterior of the duct wall member so that each baffle and the contiguous portion of the exterior of the duct wall member together form a unitary expansion chamber, or a collection chamber, depending upon the direction of air flow. The air passage communicates with each expansion chamber through apertures formed adjacent to and below the upper edge of each baffle member. The baffle members thus prevent the cereals or other products to be ventilated from entering the interior of the duct. These baffle members extend horizontally along the entire periphery of the duct.

The vertical ducts may be formed of various materials, sheet metal, wood and so on. They may also be made of concrete and in the latter case formed of identical elements each comprising a part of the duct wall, a diffusion slot and a screen preventing the cereals or products to be ventilated from entering the diffusing duct formed by the assembly of the elements which have been defined.

Several embodiments of the invention will be described hereinafter by way of example with reference to the accompanying drawing and in which:

Fig. 1 is an explanatory view, already referred to, showing the arrangement of the duct in relation to the flow slope of the stored grain;

Figs. 2 and 3 show respectively in partial sectional elevation on II—II and in horizontal section on III—III, a first embodiment of a vertical ventilation duct;

Figs. 4 and 5 are elevation and horizontal sections on IV—IV of a second embodiment of the vertical duct;

Figure 12:
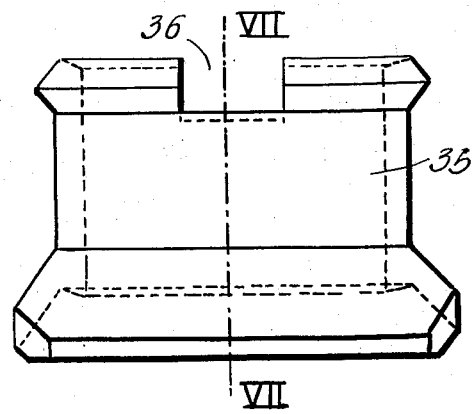
Figure 13:
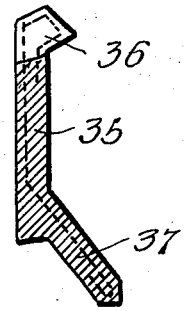
Figure 14:
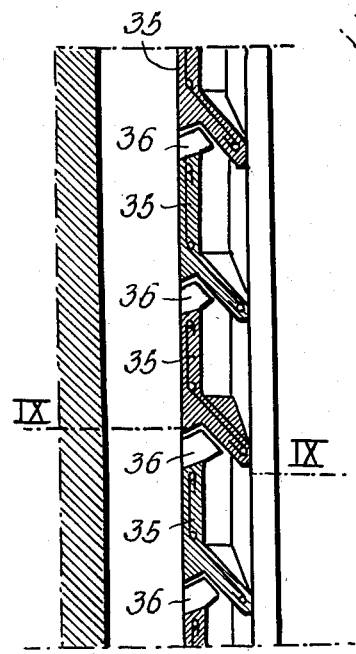
Figure 15:
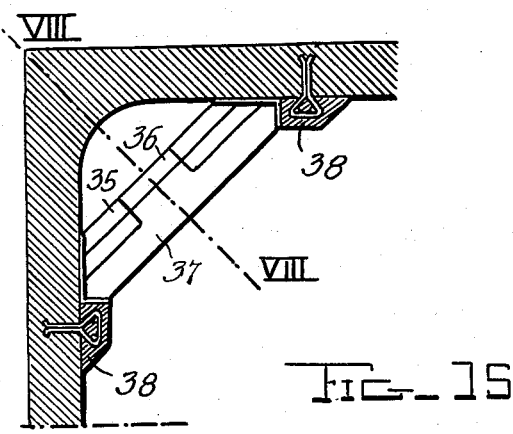

Figs. 6, 7 and 8 relate to the construction of a vertical duct in a corner of a silo or warehouse. Fig. 6 is a section on the line V—V of Fig. 8; Fig. 7 is an elevation and Fig. 8 is a section on the line VI—VI of Fig. 7;

Figs. 9, 10 and 11 are horizontal sections showing various sectional forms which the vertical ventilation ducts may take;

Figs. 12, 13, 14 and 15 relate to the construction of a ventilation duct of concrete elements;

Figs. 12 and 13 are respectively an elevation and a section of VII—VII of one of the elements used;

Figs. 14 and 15 are respectively a vertical section on the line VIII—VIII of Fig. 15 and a section on the line IX—IX of Fig. 14.

Figs. 16 and 17 are respectively a vertical section and a horizontal section of a second embodiment of a vertical duct of moulded concrete elements;

Fig. 18 is a vertical section through a silo showing a vertical duct traversing the mass of the stored grains, the said duct being entirely surrounded by cereals.

Referring to Figs. 2 and 3, a first general embodiment of a vertical type of duct is shown. It relates to an angular duct of square section. It comprises duct wall members 27 fixed by flanges 28 to the vertical walls of the storage chamber in an air-tight manner. The duct walls 27 have regularly spaced openings 29 formed therein through which the ventilation air escapes. These openings are shielded from the surrounding grain by baffle members 30 of which the lower edge is at a lower level than the lower edges of the openings 29 with which it is associated. The baffle members 30, which are subjected to the pressure of the cereal grains, are supported by bent reinforcing plates 31.

Figs. 4 and 5 show a modification of duct which only differs from the foregoing in that its section is of triangular form, the flanges of the duct wall members being inclined to fit against a flat wall instead of two perpendicular walls meeting at a corner.

A vertical diffusing duct may also be formed by making use of a corner of the silo and giving the duct section a triangular form. Referring to Figs. 6, 7 and 8, an embodiment of this kind is shown in which the walls of the duct are formed by two walls of the warehouse and by a wall 31 including from point to point openings 32 which are provided with screens 33 supported by bars 34.

This duct as well as all the vertical ducts which have been described may be formed by elements superposed one on the other.

Figs. 9, 10 and 11 show how the vertical ducts may have sections of various forms.

Referring to Figs. 12, 13, 14 and 15, an embodiment of diffusing duct is shown utilizing reinforced concrete elements.

Fig. 12 shows that each element embodies a part 35 forming the duct wall, a widened part 36 and a part forming the baffle member 37. These elements are arranged one above the other as shown in Fig. 14. They are held in place by the projections 38 (Fig. 15) arranged along the vertical walls of the silo.

Figs. 16 and 17 show a second embodiment of the vertical duct of moulded reinforced concrete. These ducts are produced by the superposition of the elements 40, 41 and 42, of which the ends are set into the walls of the silo as shown in Fig. 17.

It should be understood that the ducts which have been described are not necessarily attached to a wall of the silo or warehouse. Fig. 18 shows that the duct 43 may be centrally located in the storage chamber and traverse the mass of the grain, the entire periphery of the duct being surrounded by the grain for that portion of the duct which extends into the grain.

The ducts which have been defined may be made of any suitable materials such for example as sheet metal, wood, fibro-cement, or the like.

This case is a division of application Serial No. 241,828, filed August 14, 1951, now Patent No. 2,711,128.

What I claim is:

1. A vertically extending ventilating duct adapted for the ventilation of grain stored in a granary, said duct comprising vertical wall means at least in part defining a vertically elongated air passage, said wall means having a series of vertically spaced apertures formed therein communicating with said air passage, a series of continuous imperforate baffle members each fixed to the exterior of said wall means and each extending horizontally coextensively with said wall means, each baffle member further extending downwardly and outwardly from said wall means to shield at least one aperture and to define a unitary expansion chamber closed at its top and open at its bottom, each aperture shielded by each baffle member being located at the top of said expansion chamber, each chamber communicating with said air passage through at least one of said shielded apertures, said baffle members each further comprising a vertically downwardly extending lip positioned to prevent the entry of grain into said expansion chamber, the bottom edge of each baffle member being disposed at a level lower than the lowest portion of any aperture which is shielded thereby.

2. A ventilating duct adapted for the ventilation of grain stored in a granary, said granary having at least one air impervious wall, said duct comprising a duct wall member in air-tight engagement at its lateral edges with said granary wall, said duct wall member being shaped to extend outwardly away from said granary wall intermediate said lateral edges, whereby said duct wall member and said granary wall together define a vertically extending air passage, a series of vertically spaced downwardly and outwardly extending baffle members fixed to the exterior of said duct wall member and each together with said duct wall member defining a unitary expansion chamber closed at its top and open at its bottom, each chamber being laterally coextensive with said duct wall member, said duct wall member having at least one aperture formed therein through which the top portion of each expansion chamber communicates with said air passage, said baffle members each further comprising a vertically downwardly extending lip positioned to prevent the entry of grain into said expansion chamber, the bottom edge of each baffle member being disposed at a level lower than the lowest portion of any aperture which is at the top portion of the expansion chamber in part defined by said baffle member, whereby air may flow freely from said air passage into said grain and entry of said grain into said air passage is prevented.

3. A duct according to claim 2, in which said granary has two walls which form a corner, and wherein said wall member comprises two flat portions meeting at an angle, the free edge of each of said flat portions being in air tight engagement with one of said granary walls at opposite sides of said corner.

4. A duct according to claim 2, wherein said wall member comprises two flat portions which meet at an angle, the free edge of each of said flat portions being in air tight engagement with said granary wall.

5. A duct according to claim 2, in which said duct wall member extends arcuately away from said granary wall intermediate said lateral edges.

6. A ventilating duct adapted for the ventilation of grain stored in a granary, said duct comprising a hollow tube portion defining a vertically extending air passage, a series of continuous vertically spaced baffle members each surrounding said tube portion, the upper edge of each baffle member being in air tight connection with the exterior of said tube portion and the lower edge of each baffle member being uniformly spaced from the exterior of said tube portion thereby forming a series of unitary peripherally extending vertically spaced expansion chambers disposed along said tube portion and each extending completely around said tube portion, said tube portion having at least one aperture formed therein adjacent to and below the top edge of each baffle member through which said air passage communicates with each of said expansion chambers, each of said baffle members further comprising a downwardly extending lip disposed to prevent the entry of grain into said expansion chamber, the bottom edge of each baffle member being disposed at a level lower than the lowest portion of any aperture which is adjacent to its top edge, whereby air may flow freely from said air passage into any surrounding grain and entry of said grain into said air passage is prevented.

References Cited in the file of this patent

UNITED STATES PATENTS

| | | |
|---|---|---|
| 856,457 | Feehery | June 11, 1907 |
| 1,020,256 | Boll | Mar. 12, 1912 |
| 2,299,299 | Billis | Oct. 20, 1942 |

FOREIGN PATENTS

| | | |
|---|---|---|
| 74,403 | Switzerland | July 2, 1917 |
| 303,003 | Germany | Jan. 15, 1918 |
| 767,583 | France | Jan. 23, 1934 |
| 812,507 | France | Feb. 1, 1937 |
| 494,117 | Great Britain | Oct. 20, 1938 |